May 3, 1927.
G. M. YACKLEY
CORN PLANTER
Filed Aug. 27, 1926
1,627,537
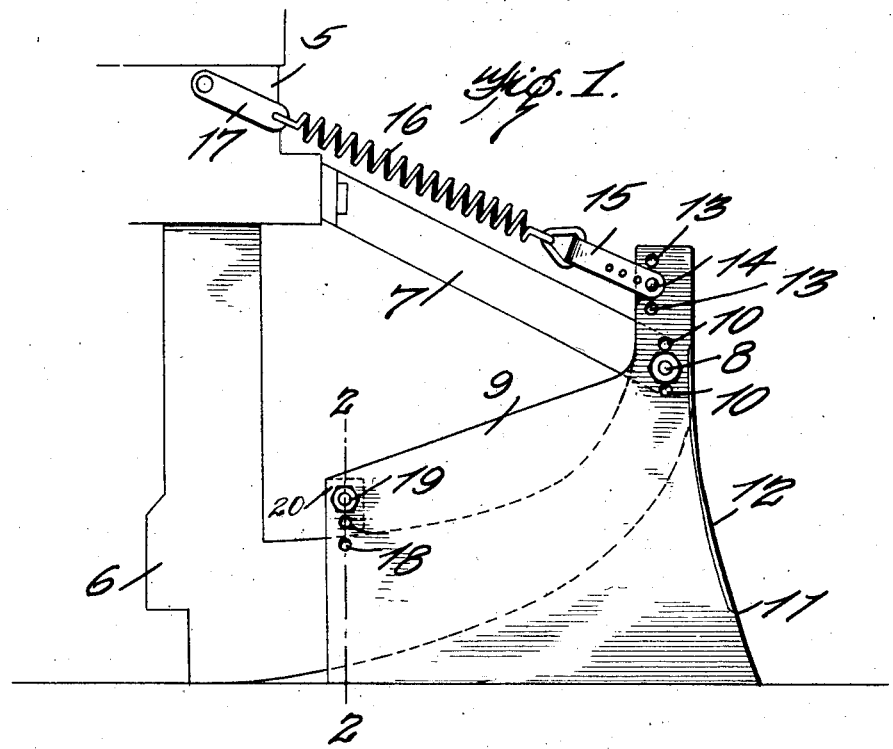
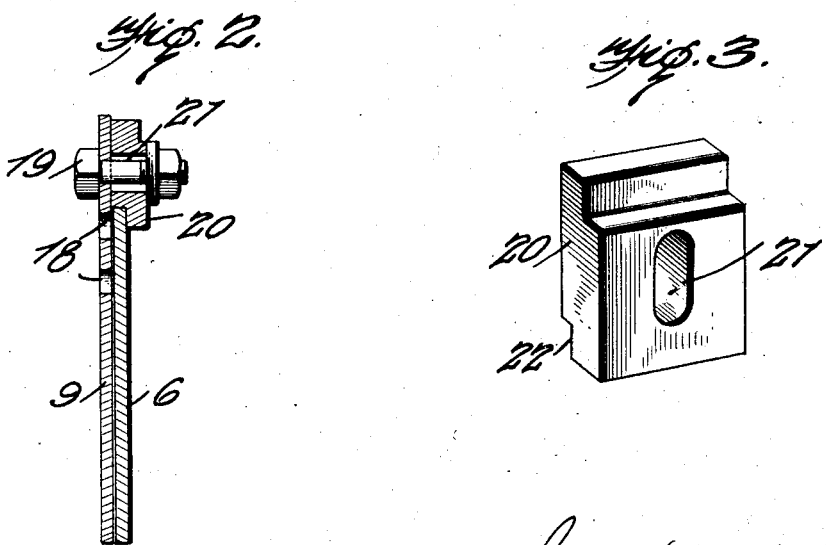
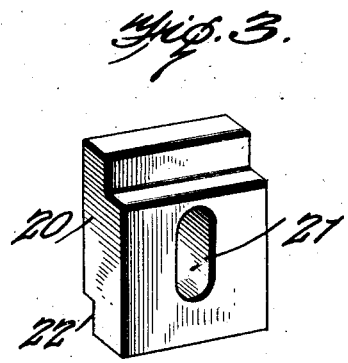
Inventor
George M. Yackley
By ......... Ackerman
Attorney Patented May 3, 1927.

1,627,537

UNITED STATES PATENT OFFICE.

GEORGE M. YACKLEY, OF AVOCA, MINNESOTA.

CORN PLANTER.

Application filed August 27, 1926. Serial No. 131,972.

This invention relates to corn planters, and has particular reference to an improvement on the invention set forth in Patent No. 1,574,955, dated March 2, 1926, and issued to this applicant.

It is an object of this invention to provide attachments for shoes of corn planters that will be effective to prevent the accumulation of sod, grass, stones or other objects which might interfere with the operation of the shoe and the planting operation; and it is an object of the invention to provide an attachment adapted to accomplish this result which will be displaceable when rigid obstructions are encountered, the said device having novel means whereby the deflecting element will be yieldingly held in operative position in order that it will be displaced, as stated, when an object is encountered which offers resistance greater than that of the means for retaining it in operative position.

It is furthermore the purpose of the inventor to provide means whereby the deflector will be maintained in operative relation to a shoe of a corn planter and guided to its operative position after it has been displaced and the shoe has passed over the object that displaced the deflector.

It is a still further object of this invention to provide a deflector having an operative forward edge of novel construction effective to withstand wear and impact due to its use, a condition which will prolong its utility and minimize the cost of maintaining it in efficient state.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a corn planter showing a device embodying the invention applied thereto;

Figure 2 illustrates a sectional view on the line 2—2 of Fig. 1 omitting parts above the upper edge of the deflector; and Figure 3 illustrates a perspective view of a retaining element or guide for the deflector.

In these drawings, 5 denotes a portion of a frame of a corn planter and 6 a shoe. The parts just identified are but conventionally shown, but their construction will be understood by those skilled in the art.

A bracket or arm 7 has one of its ends anchored to the planter structure, and it preferably extends forwardly and downwardly and is supplied with a cross bolt or pivot 8, on which the deflector 9 is oscillatably mounted. The pivot 8 may be inserted in any one of the apertures, identified by the numeral 10, to regulate the depth at which the deflector will operate. The forward edge of the deflector is blunt or is substantially the same width as the gage of the metal of which it is formed, from its lower front edge to a location identified by the numeral 11, which is substantially the depth to which the deflector will penetrate soil as the corn planter is being operated, and from the location 11 upwardly, the front edge may be bevelled or rounded, as indicated at 12. Apertures 13 are formed in an extension of the deflecting blade, which extension projects above the apertures 10 at the forward edge of the blade, and the said apertures 13 are intended to receive a connecting pin 14 for the strap or link 15, by which a spring 16 is anchored to the said extension. The spring has its inner end anchored to the planter structure in any suitable manner, as by the device identified by the numeral 17.

The purpose of providing more than one aperture 13 is to permit an adjustment of the spring connection to increase or diminish the tension of the spring, and a further adjustment to accomplish this result is afforded by providing the element 15 with a number of apertures, which may be used in connection with the pin 14.

Near the rear edge of the deflecting blade and arranged in vertical alinement, there is provided a number of apertures 18 intended to receive a fastening 19 such as a bolt, by which a guiding and movement limiting block 20 is secured on the deflecting blade. The block is intended to engage the upper edge of the planter shoe to restrict the movement of the deflecting blade on the pivot 8 in one direction and it serves to prevent the rear end of the blade from descending too far under the pull of the spring 16.

In the present embodiment of the invention, the block 20 may have a vertically disposed slot 21 which affords a limited adjustment of the block with relation to the fastening 19 and the said block has its lower edge channeled in its inner surface as at 22 to form a clearance for the reception of the upper edge of the shoe to prevent any lateral distortion or movement of the blade while it is being operated and to insure a return of the blade to its normal position in parallel relation to the shoe after it has been displaced.

The operation of the several parts of this invention has been stated in connection with a description of the parts and the construction, and it is thought that one skilled in the art will appreciate the advantages attending the changed construction over those of the patent mentioned.

I claim:

1. In a corn planter having a shoe, a deflecting blade positioned at the side of the shoe, means for pivotally mounting the deflecting blade in operative relation to the shoe, yieldable means connected to the shoe above the pivot for holding the shoe in normal position, and means for limiting the movement in one direction of the blade under the influence of the said yieldable means.

2. In a deflecting blade for corn planters, a blade having a blunt forward edge in that portion which extends into the soil, said forward edge being reduced in width at the edge above said blunt portion.

3. In a corn planter, the combination with a shoe, of a deflecting blade, means for mounting the blade for oscillation in a plane parallel to the side of the shoe, an element secured to the blade near its rear upper edge and adapted to interenegage the upper edge of the shoe for retaining the said blade parallel with the shoe and for limiting the movement of the blade in one direction, and yieldable means connected to the blade above the first mentioned pivot for normally holding the rear edge of the blade depressed with the means in engagement with the shoe.

4. In a corn planter, the combination with a shoe, of a deflecting blade, means for mounting the blade for oscillation in a plane parallel to the side of the shoe, a block secured to the blade near its upper edge and having a channel in its inner surface adapted to receive the upper edge of the shoe for retaining the said blade parallel with the shoe and for limiting the movement of the blade in one direction, and yieldable means connected to the blade above the first mentioned pivot for normally holding the rear edge of the blade depressed with the block in engagement with the shoe.

GEORGE M. YACKLEY.